W. F. CALDWELL.
Potato-Digger.
No. 56,366. Patented July 17, 1866.
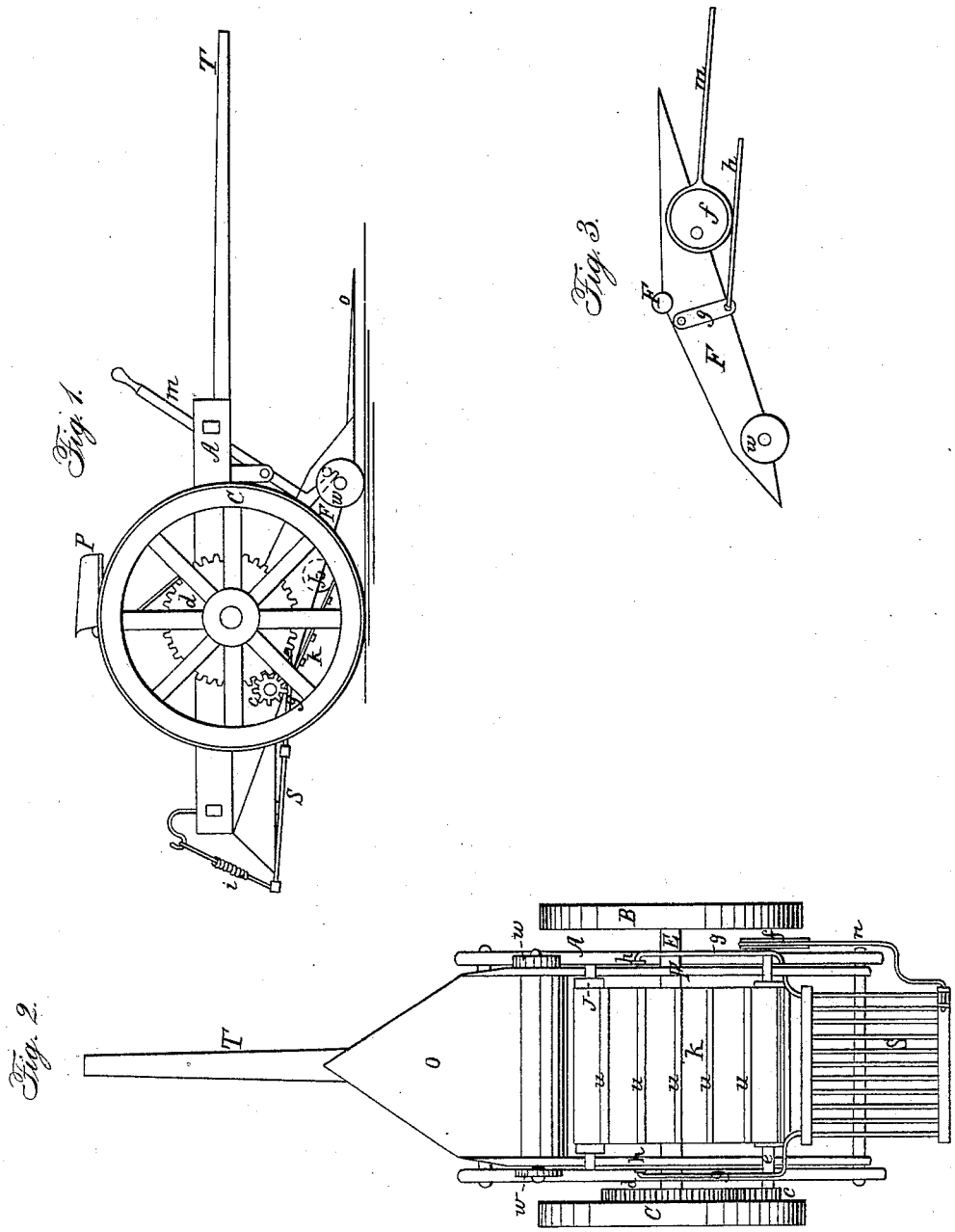
Witnesses:
Wm. C. Cushman
H. F. Caldwell
Inventor:
William F. Caldwell

UNITED STATES PATENT OFFICE.

WILLIAM F. CALDWELL, OF OXFORD, MAINE.

IMPROVEMENT IN POTATO-DIGGERS.

Specification forming part of Letters Patent No. 56,366, dated July 17, 1866.

*To all whom it may concern:*

Be it known that I, WILLIAM F. CALDWELL, of Oxford, in the county of Oxford and State of Maine, have invented a new and Improved Potato-Digger; and I hereby declare the following to be a full, clear, and exact description thereof, which will enable others to make and use my invention, reference being had to the accompanying drawings, forming part of this specification, in which—

Figure 1 shows a side elevation of my invention; Fig. 2, a plan of the bottom of the same. Fig. 3 represents a side view of the tilting frame.

The same letters indicate like parts in all of the figures.

A shows a carriage frame or body, made as shown in the drawings, and running upon the wheels B C. The carriage is drawn by animal-power by the tongue T. The wheels B and C revolve upon the shaft E. To the shaft E is also attached the tilting frame F.

Upon the inner side of the wheel C, and rigidly attached thereto, is the geared wheel *d*. This wheel turns the smaller geared wheel *c*, as seen in the drawings.

The wheel *c* is rigidly attached to the shaft *e*, extending across the width of the carriage-body. Upon the other extremity of the shaft *e* is attached the eccentric *f*. The object of this combination is to impart a vibratory motion to the sifter *s*. This is effected by means of the connecting-rod *n*, attached to the periphery of the eccentric *f* and the end of the sifter *s*. This shaft *e* is set in the tilting frame F. The sifter *s* is also suspended from the rear end of the tilting frame F by the arms *g* and *h*, placed on both sides thereof. The sifter is also attached to the carriage at its rear end by the helical spring *i*.

*j* shows another shaft, set in the tilting frame F. Around this shaft and the shaft *e* passes the endless apron *k*, to which motion is given by the revolution of the shaft *e*. Across the apron *k*, at short intervals, are placed the cups or buckets *u*. The frame F has also, on its forward end, the trucks *u* and scoop or digger *o*.

The tilting frame is held in the position shown in Fig. 1 by the helical spring *i*; but the forward end thereof may be lifted from the ground by the lever *m*, attached to the carriage-body, as seen in the drawings, the lever having a hook at its lower extremity, which hook catches a small bolt set into the tilting frame, as indicated in Fig. 1.

P shows the driver's seat, set in the center of the carriage-body.

Having thus indicated the separate parts of my invention, I will now proceed to describe its operation: As the carriage is drawn along the surface of the ground the scoop or digger *o*, piercing the successive hills, scoops up the contents thereof. By the accumulation of earth, &c., within the scoop its contents are pushed backward until they come in contact with the apron *k*. Dropping upon this they are caught by the cups or buckets *u*, and deposited upon the sifter *s*, by the vibratory motion of which the earth is sifted and separated from the vegetables thus taken up by the digger *o*. By drawing the lever *m* backward the digger can be raised from the ground and its contents caused to slide backward upon the apron.

I do not claim to be the first inventor of a method of imparting a vibratory motion in implements of this description to the sifter by means of the revolutions of the wheels of the carriage, or of imparting motion by the same means to any device employed to carry the earth and vegetables to the sifter; neither do I claim the digger *o* to be my invention; but What I do claim, and desire to secure by Letters Patent, is—

1. The combination and arrangement of the geared wheels *d* and *c*, shaft *e*, eccentric *f*, and connecting-rod *n*, as and for the purposes herein described, the said wheel *c*, shaft *e*, eccentric *f*, and the sifter *s* being attached, as set forth, to the tilting frame F, and the shaft *e* being also employed to give motion to the endless apron *k*.

2. The combination and arrangement of the arms *g h* and helical spring *i*, to hold the sifter, as described.

3. The arrangement of the tilting frame F upon the shaft E, for the purposes herein set forth and described.

WILLIAM F. CALDWELL.

Witnesses:
WM. E. CUSHMAN,
H. F. CALDWELL.